United States Patent

[11] 3,547,460

| [72] | Inventors | Rudolf Gottschald, deceased, late of Osterath, Germany, by Erika Gottschald, heiress, Osterath, |
|---|---|---|
| [21] | Appl. No. | 776,289 |
| [22] | Filed | July 15, 1968 |
| [45] | Patented | Dec. 15, 1970 |
| [73] | Assignee | A. Ehrenreich & Cie a firm of Germany |
| [32] | Priority | July 13, 1967 |
| [33] | | Germany |
| [31] | | No. 1,630,417.9 |

[54] STEERING GEAR
1 Claim, 4 Drawing Figs.

[52] U.S. Cl. .................................................. 280/95
[51] Int. Cl. .................................................. B62d 7/16
[50] Field of Search ........................................... 280/95, 96; 287/90

[56] References Cited
UNITED STATES PATENTS

| 2,305,881 | 12/1942 | Leighton .................. | (280/95UX) |
|---|---|---|---|
| 2,479,339 | 8/1949 | Gair ......................... | 280/95 |
| 2,771,300 | 11/1956 | Latzen ...................... | 280/95 |
| 3,113,787 | 12/1963 | Lauderdale ................ | 280/95 |

*Primary Examiner*—Kenneth H. Betts
*Attorney*—Arthur Schwartz

ABSTRACT: The tie rod, which forms the steering linkage, includes a center rod and two outer rods connected by axial ball joints. Ball joints on the center rod for the steering rod and guide lever also have their centers located on the axis of the center rod.

PATENTED DEC 15 1970
3,547,460
FIG. 1
FIG. 2
FIG. 3
FIG. 4
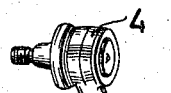
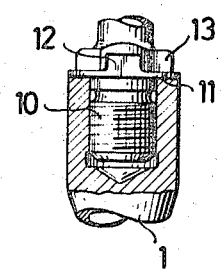
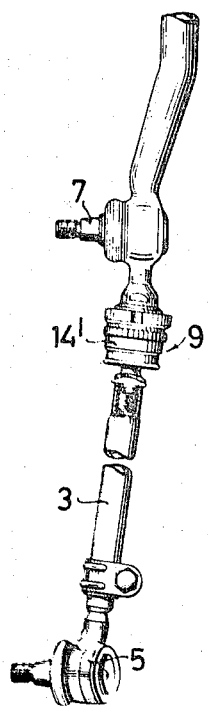
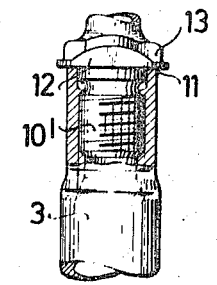
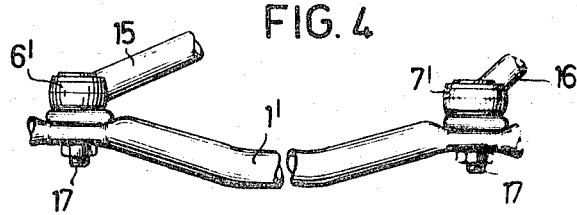

STEERING GEAR

The present invention relates to a steering gear for motor vehicles in the form of a tie rod consisting of three parts and comprising a center rod connecting the steering arm and the loosely following guide lever each via a ball joint as well as an outer rod connected to either end by means of a ball joint and leading to the guide arm of the wheel.

With the steering gears of the above type already known the ball joints establishing the connection between the center rod ends and the outer arm ends are angular joints, that is to say, the case pin to be connected to one end is at an angle with respect to the joint pin to be connected to the other part, resulting in the fact that moments will occur between the outer arms and the center rod which are directed towards tilting and which will have to be taken up by the steering arm and the guide lever which means increased strain of the steering gear and of the guide parts connected to the same.

It is the principal object of the present invention to design the steering gear of the type mentioned above such that the detrimental strains referred to will not occur.

According to the present invention this problem has mainly been solved in that the ball joint establishing the connection between either end of the center rod and an outer rod has been constructed as an axial ball joint.

Favorably, the ball center of the axial ball joints as well as the ball center of the joints for the connection of the center rod to the steering arm and the guide lever are located on the same axial line passing said centers.

According to the present invention it will be achieved that the tie rod consisting of three parts will practically not have to receive any tilting moments.

It is recommended to screw the joint pin of the axial ball joint into the end of the center rod or of the outer rod. This will be favorable in that adjustments in the steering gear will be possible due to screwing of the joint pin.

The accompanying drawing shows an example of a construction according to the present invention.

FIG. 1 is a longitudinal view of a tie rod consisting of three parts.

FIG. 2 is a longitudinal section of the left end of the center rod, the joint pin of the axial ball joint having been screwed in.

FIG. 3 is a longitudinal section of the end of the right hand outer rod facing the center rod, the joint pin of the axial ball joint having been screwed in.

FIG. 4 shows a center rod with the ends having been broken off in which the ball joints have been provided in the steering arm and the loosely following guide lever.

The tie rod which forms the steering linkage, comprises the center rod 1 and the two outer rods 2 and 3. The ends of the outer rods are each connected via a ball joint 4, 5 to the steering lever of a wheel to be guided by said lever.

The outer rods have been constructed in a manner already known so that a corresponding description may be omitted.

The center rod has been connected via the ball joint 6 to a steering arm not shown and via the ball joint 7 to a loosely following guide lever not shown either. The ball joints 6 and 7 have been inserted into the center rod. The ball center is located on the axis of the center rod.

An arrangement will even be possible in which the ball joints 6' and 7' are located in the steering rod 15 and the loosely following guide lever 16. The joint pins 17 of the ball joints engage into eyes provided in the center rod, their axes being located on the axis of the center rod. An arrangement of this kind has been shown in FIG. 4.

The ends of the center rod are connected each via an axial ball joint 8 or 9 respectively to the end of an outer rod.

The ball centers of the axial ball joints 8 and 9 as well as the ball joints 6 and 7 are located on the same axial line.

In the case of the left hand axial ball joint 8 the joint case 14 has been provided at the outer rod 2 while the joint pin 10 has been screwed into the end of the center rod 1, as may be seen from FIG. 2. The screwed-in joint pin has been secured by the washer 11 which, on one or two opposite sides, has been provided with a tongue 12, in which case the tongue will be bent against a flat surface of the pin polygon 13 for the attack of a wrench after insertion of the pin.

The joint pin 10' of the right hand axial ball joint 9 has been screwed into the outer rod 3. The joint case 14' has been located at the end of the center rod. The screwed-in joint pin has been secured in the same way as shown in FIG. 2.

It is claimed:

1. A steering gear for motor vehicles in the form of a three-piece tie rod comprising:
   a. a center rod;
   b. a steering arm pivotally connected to said center rod;
   c. a ball joint connecting said arm to said rod;
   d. a loosely following guide lever pivotally connected to said center rod;
   e. a ball joint connecting said lever to said rod;
   f. a pair of outer rods connected by means of axial ball joints to said center rod;
   g. said center rod having an axis passing therethrough;
   h. said first mentioned ball joints and said axial ball joints having their centers located on said axis; and
   i. said axial ball joints having pins extending substantially in the direction of both said axis and said outer rods.